Sept. 23, 1941.   A. W. HUBBELL   2,256,775
PIPE-LINE PLUG
Filed April 18, 1940
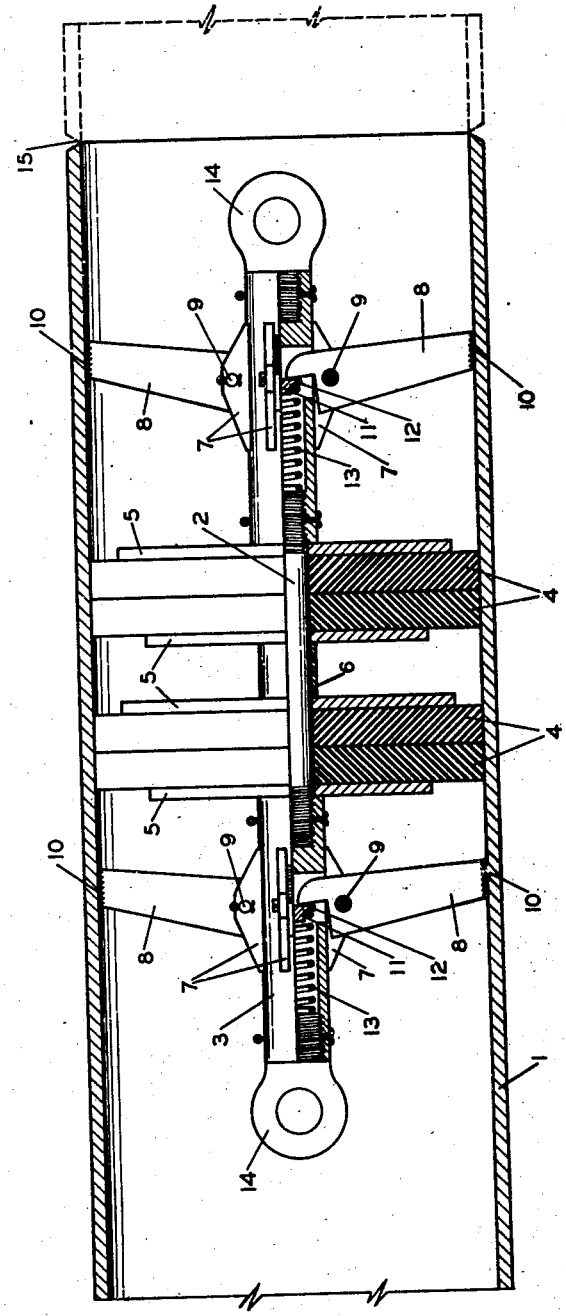
INVENTOR
ALFRED W. HUBBELL
BY
Hudson, Young, Shanley & Yinger
ATTORNEY Patented Sept. 23, 1941

2,256,775

UNITED STATES PATENT OFFICE 2,256,775

PIPE-LINE PLUG

Alfred W. Hubbell, Bartlesville, Okla., assignor to Phillips Petroleum Company, a corporation of Delaware Application April 18, 1940, Serial No. 330,411

3 Claims. (Cl. 138—89)

This invention relates to a plug and more particularly to a pipe line plug which is adapted to stop the flow of fluid while the pipe line is out of service, such as during repairs.

The maintenance of pipe lines that are employed to convey various types of fluid from one location to another includes repairing the line for leaks and breaks whenever they occur. It is often essential in carrying out these repairs to remove an impaired portion of piping and replace the same with a corresponding length of new pipe. When a new length of pipe is to be placed in a high section of a line that is provided with the usual valves, it is a simple matter to isolate this section from the remainder of the line by merely closing the necessary valves before removing the damaged piping and reopening the valves upon completion of the repair work. On the other hand, should a leak or break take place in an inclined section of the line, fluid contained in the line will flow back downwardly from the highest point of the section and escape through the break or leak opening. This results in many instances in costly loss of fluid and also creates a hazardous condition. This is especially true when the fluid being transmitted is inflammable, such as gasoline or some other combustible liquid, and it is desired to weld the new piece of pipe in place.

The present invention obviates all the difficulties experienced heretofore and provides a device which may be readily inserted in a line to effectively plug the same to thereby prevent loss of material and eliminate the danger of fires or explosions. As will be more fully set forth further along in this specification, my invention includes a central body member upon which is mounted one or more flexible discs for sealing off flow of fluid through a pipe and means for gripping the inside wall of the pipe upon movement of the device in one direction through the pipe but permitting unimpeded movement of my device in the opposite direction when the line is again placed in service.

It is the primary object of this invention to provide a plugging device that can be readily inserted in a pipe line to effectively seal the line against flow from the down-stream side thereof while repairs are being made.

Another object of this invention is to provide plug means which may be urged through the line by the application of fluid pressure upon its upstream side and then removed from the line at any convenient point.

This invention has for a further object the provision of a pipe plug which is positive and dependable in operation, simple and sturdy in design, and inexpensive to manufacture and maintain.

These and other objects and advantages will be apparent to those skilled in the art by reference to the following detailed description, taken in conjunction with the annexed drawing which illustrates a longitudinal view, partly in cross section, of a preferred embodiment of my invention.

Referring to the drawing, I have denoted therein a portion of a pipe 1 within which is a central body consisting of a shaft 2 and a pair of elements 3 which are tapped at each end, each of these elements 3 being in threaded engagement with shaft 2. Mounted on the shaft are plugs or discs 4 which are preferably made of rubber or any other similar flexible material. Back-up plates 5 are also mounted on the shaft adjacent plugs 4 and cooperate with a spacer 6 and elements 3 to retain the plugs in desired fixed position on the shaft. While a number of plugs are illustrated in the drawing, it is to be understood that a single plug or disc may be employed for the purposes of my invention, if desired; the number and configuration of these discs being purely optional and a matter of design. Yokes 7 extend radially of elements 3 and pivotally support arms 8 on pins 9. It will be noted that the outer end of each arm is provided with teeth 10 for engagement with the inside wall of pipe 1. The inner end of each arm is notched to receive a bearing member 11 that has an annular shoulder 12 which serves as a seat for compression spring 13. Referring to the spring at the left portion of my device, it will be seen that this spring is maintained in compression by an eye bolt 14 that is in engagement with element 3. The compression spring shown on the right side of the drawing is compressed against its seating member by the right hand threaded portion of shaft 2. The effect of both of these springs is to urge arms 8 about pins 9 so as to place the outer ends of these arms in contact with the inside wall of the pipe. The length of arms 8 is such that it is impossible for them to assume a position at right angles to the pipe and then pass beyond dead center.

For the purpose of outlining the operation of this invention, it is assumed that the pipe line has been cut at 15 and that fluid, unless plugged off, will run from a point of higher elevation down the pipe and outwardly therefrom at 15. My device is inserted in pipe 1 through open end 15, as shown in the drawing. When it has been inserted a sufficient distance, the operator pulls on eye bolt 14 at the right end of the device, causing teeth 10 to firmly grip the inside wall of the pipe and maintain the device as a whole in fixed position. The static head of the fluid to the left of my device will also cause the teeth to more securely engage with the inside wall of the pipe, thus preventing the fluid from forcing my device out of the pipe. Flexible plugs 4 fit snugly with the inside of the pipe and effectively seal the pipe to prevent fluid from seeping through and beyond my device. With the flow of fluid thus completely stopped by my device, a new piece of pipe may be readily installed by welding or any other desirable method without loss of fluid or danger to the workers. As soon as repair work is completed, the line is again placed in service and fluid is transmitted through the pipe line from right to left in direction. The pressure of this fluid flow causes the gripping arms to become disengaged with the inside of the pipe and the complete device is urged through the pipe line until it arrives at a convenient point from which it may be removed from the system.

From the foregoing it is believed that the construction, operation and advantages of my present invention will be readily comprehended by persons skilled in the art. It is to be clearly understood, however, that the form of my invention herewith shown and described is to be taken as a preferred example of the same and that various changes in the shape, size and arrangement of parts may be resorted to without departing from the spirit of my invention as defined by the appended claims.

I claim:

1. A pipe line plugging device comprising a central body; a plug member carried by the central body; and means including a hollow member having one end connected to the central body, a closure removably connected to the other end of the hollow member, a plurality of slots in the hollow member, a plurality of arms pivotally supported on the hollow member and extending outwardly therefrom, a portion of each arm extending through a corresponding slot and into the hollow member, and a spring in the hollow member intermediate the closure and the portion of the arms in the hollow member for urging the arms into engagement with the inside wall of the pipe to prevent movement of the device therethrough in one direction but permitting movement of the device therethrough in the opposite direction.

2. A pipe line plugging device comprising a central body; a plug member carried by the central body; and means including a hollow member having one end connected to the central body, a plurality of slots in the hollow member, a plurality of arms pivotally supported on the hollow member and extending outwardly therefrom, a portion of each arm extending through a corresponding slot and into the hollow member, and a spring in the hollow member intermediate the central body and the portion of the arms in the hollow member for urging the arms into engagement with the inside wall of the pipe to prevent movement of the device therethrough in one direction but permitting movement of the device therethrough in the opposite direction.

3. A pipe line plugging device comprising a central body; a plug member carried by the central body; and a pair of means disposed on opposite sides of the plug member, one of said means including a hollow member having one end connected to the central body, a closure removably connected to the other end of the hollow member, a plurality of slots in the hollow member, a plurality of arms pivotally supported on the hollow member and extending outwardly therefrom, a portion of each arm extending through a corresponding slot and into the hollow member, and a spring in the hollow member intermediate the closure and the portion of the arms in the hollow member for urging the arms into engagement with the inside wall of the pipe to prevent movement of the device therethrough in one direction but permitting movement of the device therethrough in the opposite direction; the other said means including a hollow member having one end connected to the central body, a plurality of slots in the hollow member, a plurality of arms pivotally supported on the hollow member and extending outwardly therefrom, a portion of each arm extending through a corresponding slot and into the hollow member, and a spring in the hollow member intermediate the central body and the portion of the arms in the hollow member for urging the arms into engagement with the inside wall of the pipe to prevent movement of the device therethrough in the above first mentioned direction but permitting movement of the device therethrough in the opposite direction.

ALFRED W. HUBBELL.